Jan. 13, 1970     W. J. ARNETH     3,489,247
METHOD AND SYSTEM FOR HANDLING STOCK

Filed March 26, 1968     3 Sheets-Sheet 2

Inventor
William J. Arneth
By Lucke & Lucke

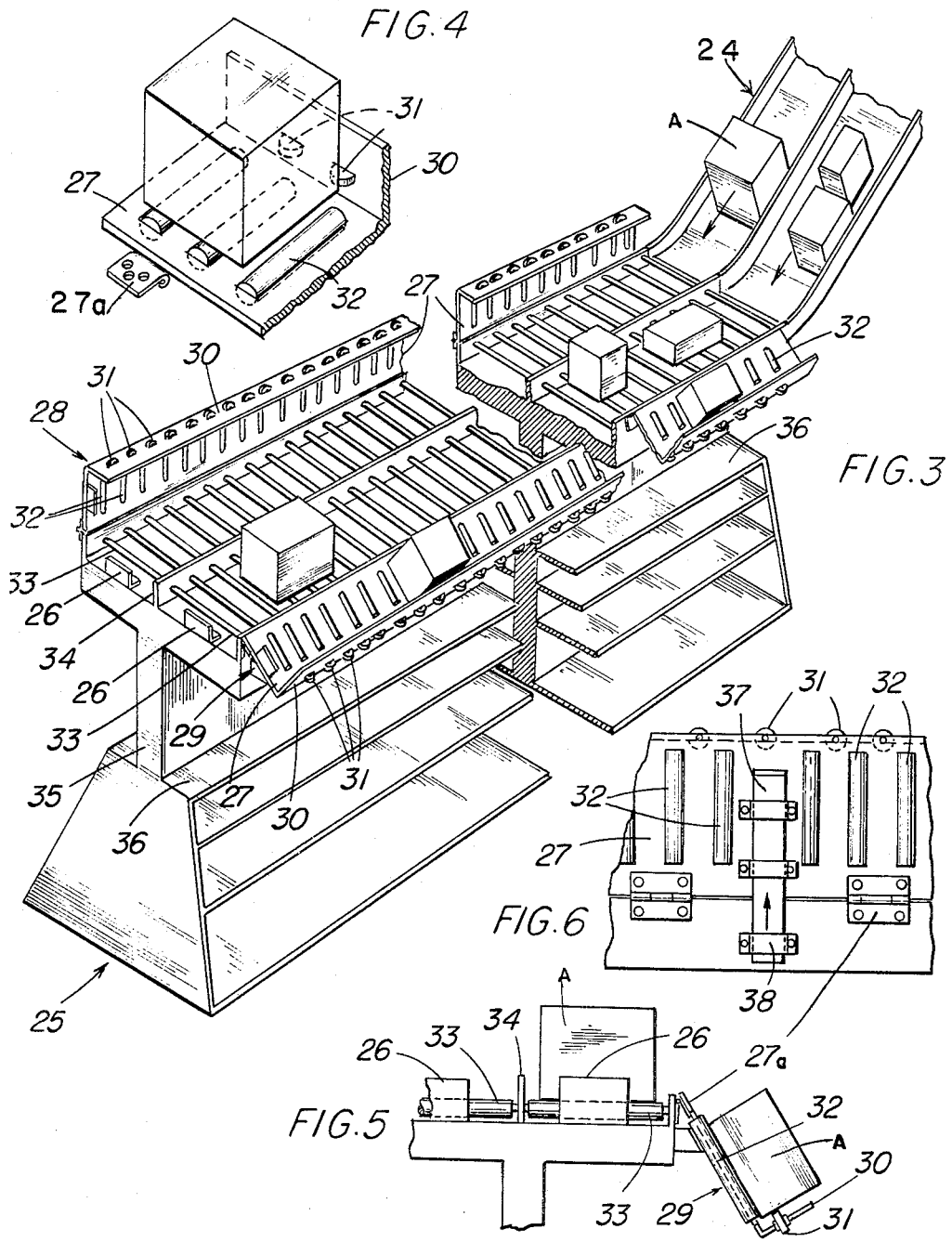

United States Patent Office 3,489,247
Patented Jan. 13, 1970

3,489,247
METHOD AND SYSTEM FOR HANDLING STOCK
William Joseph Arneth, 1705 A St.,
Belmar, N.J. 07719
Filed Mar. 26, 1968, Ser. No. 716,214
Int. Cl. E04h 3/04
U.S. Cl. 186—1                11 Claims

ABSTRACT OF THE DISCLOSURE

A system for continuously unloading stock from trucks, basements, storerooms, etc., conveying it to a raised process area where cartons of fresh, canned, bottled, frozen and/or packaged foods, drugs and household items, etc. are opened and tray packs are price stamped and routed onto a selected descending conveyor terminating above the particular gondola from which each item is thereafter stacked for sale.

BACKGROUND OF THE INVENTION

Field of the invention

This invention relates to a system for receiving, opening, stamp pricing and mechanically allocating cartons of diversified merchandise on an elevated level remote from the selling area and continuously moving such half cartons or tray packs along segregated routes to an accessible position atop the particular location of a gondola from which each item will be sold.

Such mechanized system of continuously supplying stock to its shelves eliminates the necessity for night crews, part timers and/or second jobbers, who largely contribute to wrong pricing and other inefficiencies. A raised platform, balcony, second floor, etc. in lieu of or situated over a storage area would decrease the amount of storage space required and conversely increase the area available for selling by 25%.

Description of the prior art

Hitherto cartons of merchandise are unloaded from delivery pallets onto live skids in the storage room. The skids are pulled into the selling area from which most cartons are cut by hand and individual items hand stamped in the isles before being placed on the shelves. This not only involves the labor of lifting and handling heavy cartons, but also clutters and crowds the isles, adding to the confusion of customers, especially during peak selling periods and presenting obstacles over which customers often trip. Present practices include the possibility of storing heavy packages over cartons of softer goods, wherein the former tend to fall from collapsed supports and endanger personnel.

SUMMARY OF THE INVENTION

The herein disclosed stock handling system is characterized by a raised platform located in a storage room at the rear of the store adjacent the unloading station. Loaded pallets are mechanically unloaded from the trucks to the platform by a forklift. Or, cartons can be fed to a standard wheel gravity conveyor by an ascending electric conveyor. The cartons are then placed on a processing and distributing conveyor by a conventional automatic depaletizer for either manual cutting and stamping, or passed under conventional electric automatic equipment to effect the same functions.

Tray packs are then rolled along or across said distributing conveyor to a selected opening in the wall between the platform and selling area and routed upon a declining gravity conveyor leading to the top of the particular gondola from which such items are to be sold.

BRIEF DESCRIPTION OF THE DRAWINGS

Further features and advantages of the invention will be apparent in the following detailed description and the accompanying drawings which illustrate preferred embodiments of the invention, wherein

FIG. 3 is an enlarged perspective view of a portion of a gondola with a double overhead feed conveyor showing a section of guard rail in uprght position on one side of the conveyor and in inclined position on the other side;

FIG. 4 is a perspective view of a section of the lowered guard rail shown in FIG. 3;

FIG. 5 is an end view of the double feed conveyor illustrated in FIG. 3 showing a lowered hinged guard rail; and FIG. 6 is an elevational side view of a section of the guard rail in closed position.

Referring now to the drawings, FIG. 1 shows a floor plan of a supermarket or other self-service store having a rear receiving and storage room 10, a processing platform 11 elevated above the floor level of room 10 and a selling area 12.

Figure 1:
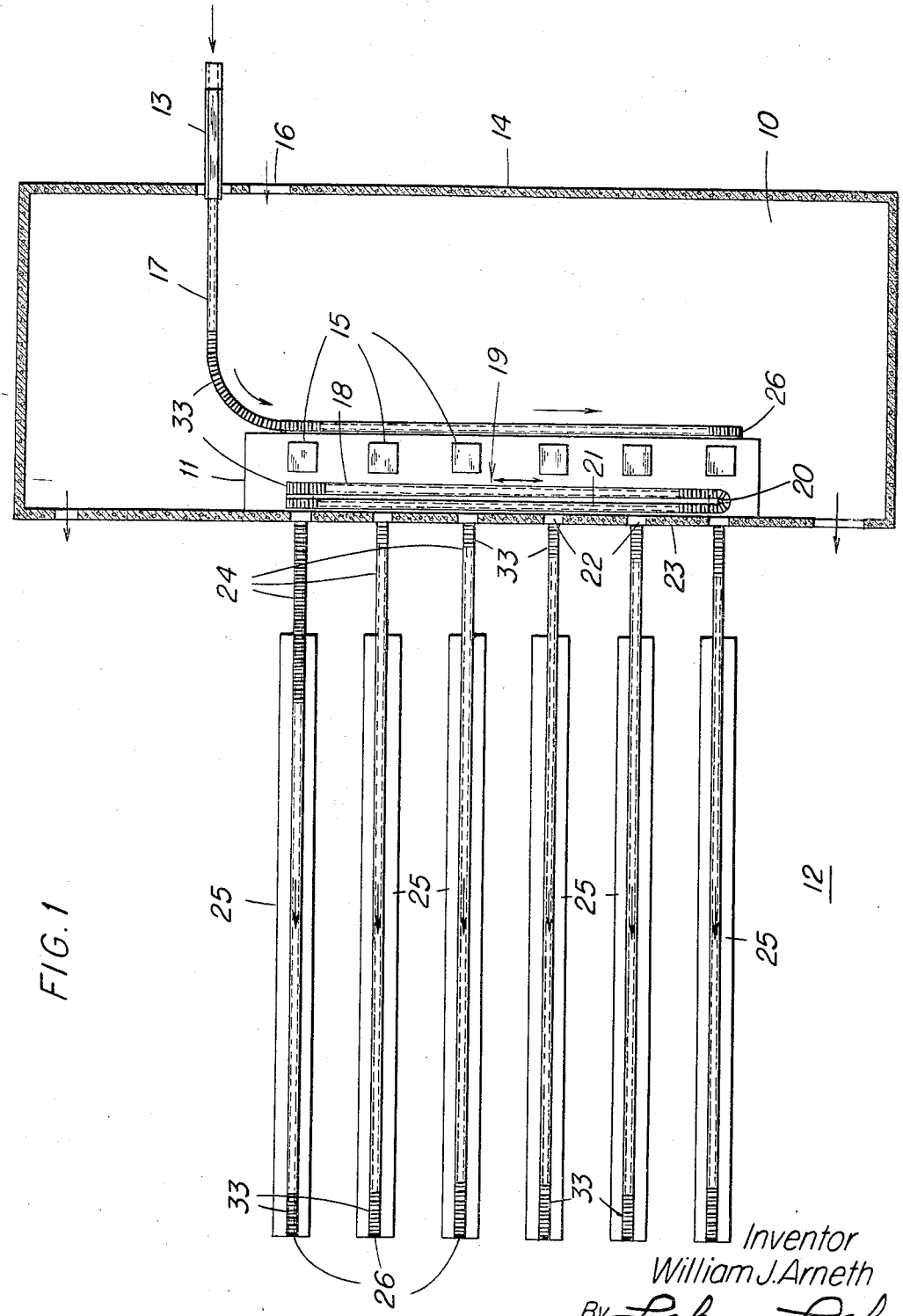
FIG. 1 is a plan schematic view of the stock handling system comprising my invention.
Figure 2:
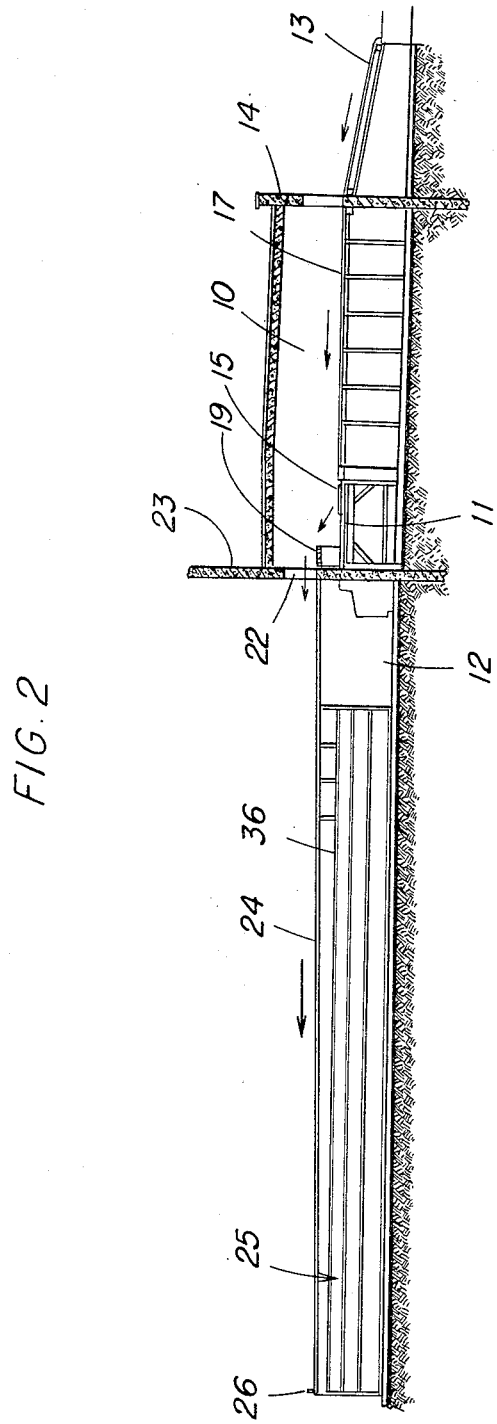
FIG. 2 is an elevational schematic view of the system shown in FIG. 1.

An electric conveyor 13 extends beyond the rear wall 14 of the storage room for receiving cartons (not shown) from delivery trucks. The cartons are then fed to an inclined standard wheel conveyor 17 which rolls them up to and along the length of the processing platform 11 to any desired position thereon. Stock-laden pallets 15 can be fork-lifted direct from trucks through entry 16 and deposited on the platform floor, as shown in FIGS. 1 and 2.

Cartons of stock may then be raised from the pallets or conveyor 17 and placed on the proximate leg 18 of a U-shaped roller track 19 on which they are cut in half and the contents thereof price stamped either manually or by conventional automatic equipment. The half cartons or tray packs A are then pushed around the bend 20 on rollers to the remote leg 21 of the track to any of a series of openings 22 in the wall 23 through which packs or individual packages are fed onto a live or gravity inclined conveyor 24 which transports them to the top of the particular gondola 25 and/or the particular side thereof, from which each item will be sold.

The conveyors 24 are provided with a stop 26 at each end. Guard rails 27 are mounted along both sides of the conveyor to prevent articles from sliding off of the inclined surface. Advantageously, sections of the rail may be attached to the sides of the conveyor as by hinges 27a and lowered from the raised, closed position 28, as shown on the top of FIG. 3 to a downwardly inclined position 29 from which tray packs or other items from the conveyor 24 atop the shelving may be readily removed.

The guard rails tilt to approximately a 35° angle when released from their upright position, as shown in FIGS. 3 and 5. A short lipped flange 30 is disposed along the outer free edge of the rails which can be provided with a row of small wheels 31. These wheels cooperate with a row of rollers 32 mounded on the rails to facilitate rolling stock along the top of the gondolas in either direction.

The conveyors 24 can have one set of rollers, wheels, bearings, etc. 33, as shown in FIG. 1, or two sets to service frozen food cases (not shown) and each side of the gondola, as shown in FIGS. 3 and 5. In the latter case, a median strip or separator 34 is erected between the two sets of rollers to retain merchandise in its proper lane.

The conveyors are shown mounted above the gondolas by a T-shaped bracket support 35, but the top shelf 36 of the gondolas could be provided with rollers or the like having side edges of from one to two inches high, to effect a built-in component conveyor system which could be connected to an extension leading up to openings 21. The brackets 35 could diminish in height from the near end to the far end of the gondolas to provide a completely gravity run. Or, alternatively, the rollers over the gondolas can be level, but always elevated over the isles for free traffic flow.

FIG. 6 illustrates one way in which the side rails 27 may be rigidly supported in upright closed position as by periodically spaced bars 37 seated within a plurality of brackets 38 mounted on the conveyor 24 and side rail 27.

The forms of the invention here described and illustrated are presented merely as examples of how the invention may be embodied and applied. Other forms, embodiments and applications of the invention will of course suggest themselves to those skilled in the art.

I claim:

1. A method of handling stock in retail stores comprising the steps of delivering stock containers to an elevated process area, placing said stock upon a delivery conveyor, splitting open said containers, price-stamping the merchandise contained therein, moving said merchandise on said delivery conveyor to a selected transverse conveyor terminating at the far end of a gondola, routing said merchandise along said transverse conveyor and then removing said merchandise from atop of said gondola and placing it on a shelf thereof for sale.

2. A method of handling stock in retail stores comprising the steps of placing stock on a first conveyor from a delivery source to an elevated processing area, removing cartons of stock from said first conveyor to a second conveyor, splitting open said cartons and price-stamping merchandise contained in each resulting half carton, moving said merchandise around said second conveyor to a coaxial position with a gondola from which said merchandise will be sold and routing said merchandise on a third conveyor terminating at the far end of said gondola.

3. A method according to claim 2, including the steps of lowering a section of guard rail from said third conveyor before removing said merchandise therefrom.

4. A method according to claim 3, including the steps of adjusting said guard rail section at an appropriate angle and then sliding said merchandise along the edge thereof in either direction to its proper position above the shelving of said gondola.

5. A stock handling system for retail stores comprising in combination a first conveyor means connecting a receiving depot to an elevated platform, a second conveyor means running parallel to said platform, and a series of transverse third conveyor means, a portion of each of said transverse means being mounted above a length of shelving disposed in the selling area of said store, said transverse means inclining from said platform to the terminal end of each length of shelving.

6. A system according to claim 5, wherein said transverse means comprises at least one set of revolving means over which stock is rolled down to said shelving.

7. A system according to claim 6, wherein guard rails are mounted along both sides of said transverse means, sections of said rails being detachable from said transverse means for access to said stock.

8. A system according to claim 7, wherein said guard rails comprise an upright portion and a flanged lip projecting inwardly from the outer edge thereof, and a row of small wheels mounted on said lip.

9. A system according to claim 8, wherein a row of rollers is mounted on said upright portion.

10. A system according to claim 5, wherein said third conveyors are supported by a series of T-shaped brackets mounted on top of said gondola.

11. A system according to claim 10, wherein said brackets diminish in height from the near end of said gondola to its far end, relative to said third conveyor means.

References Cited

UNITED STATES PATENTS

| 823,470 | 6/1906 | Holmes | 186—1 |
| 2,071,770 | 2/1937 | Shield | 186—1 |

HARVEY C. HORNSBY, Primary Examiner

U.S. Cl. X.R.

198—19; 209—125